March 11, 1941. M. H. HOLLINGSWORTH 2,234,527
CLOCK HORN BUTTON
Filed March 12, 1936 3 Sheets-Sheet 1
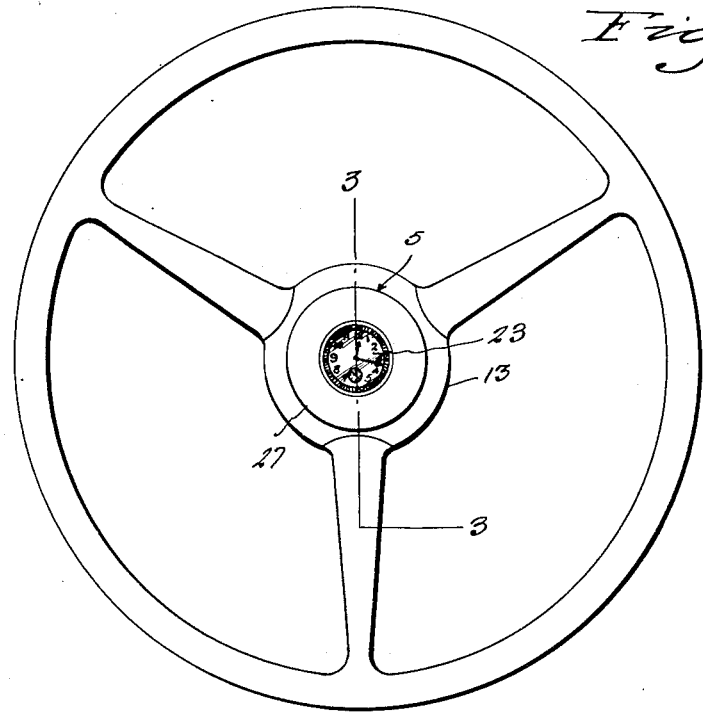
Fig. 1.
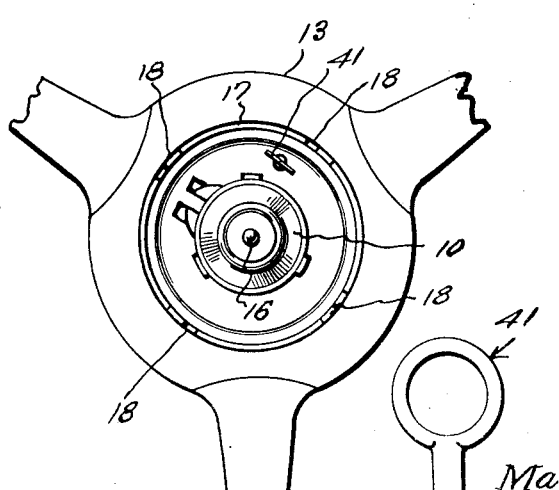
Fig. 2.
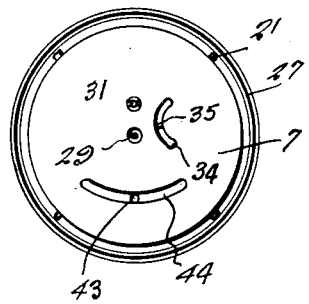
Fig. 4.
Fig. 9.
Inventor
Maurice H. Hollingsworth
By Clarence A. O'Brien and
Hyman Berman
Attorneys March 11, 1941.          M. H. HOLLINGSWORTH          2,234,527
CLOCK HORN BUTTON
Filed March 12, 1936          3 Sheets-Sheet 2
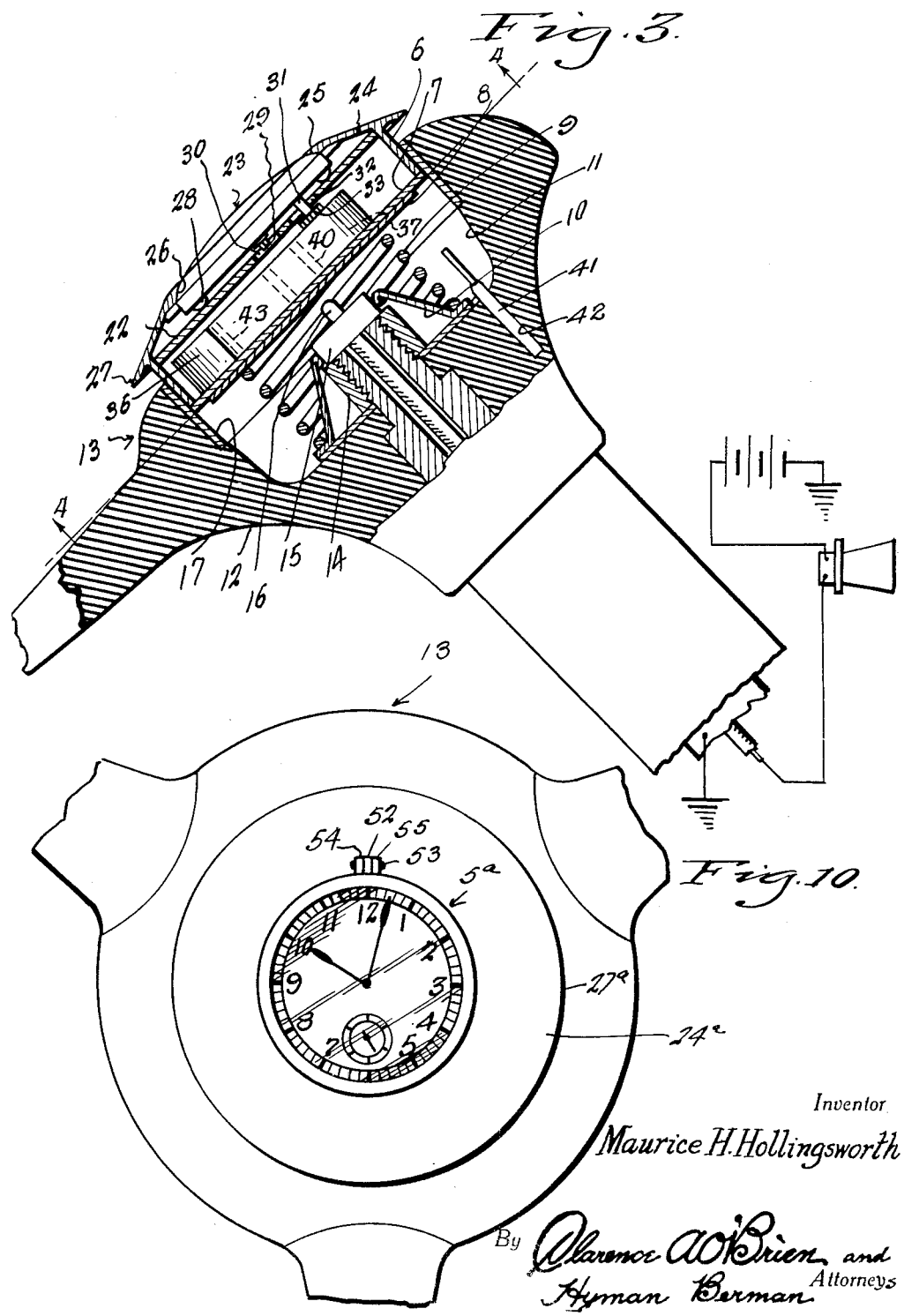
Inventor
Maurice H. Hollingsworth
By Clarence A. O'Brien and
Hyman Berman
Attorneys March 11, 1941.  M. H. HOLLINGSWORTH  2,234,527
CLOCK HORN BUTTON
Filed March 12, 1936  3 Sheets-Sheet 3
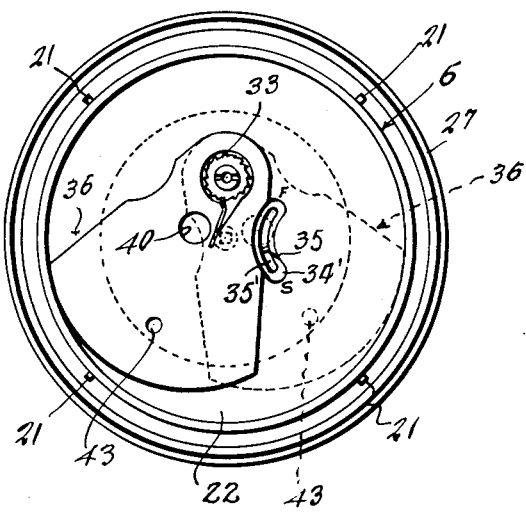
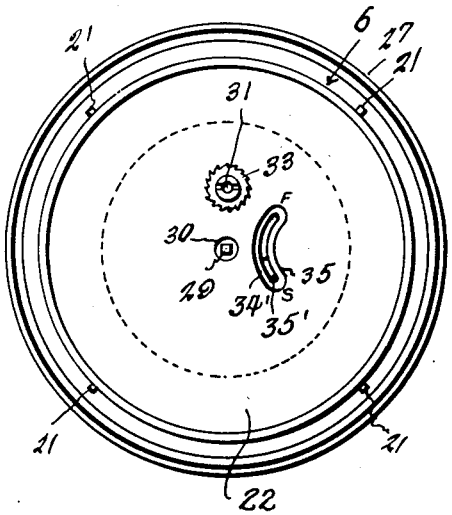
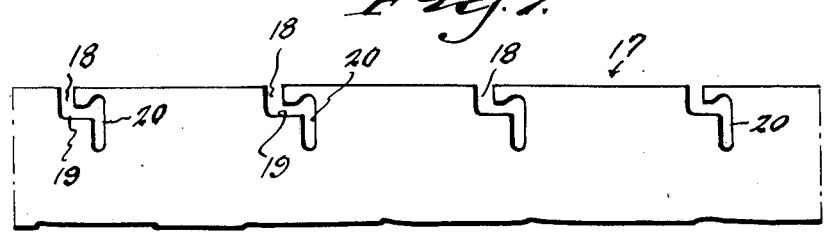
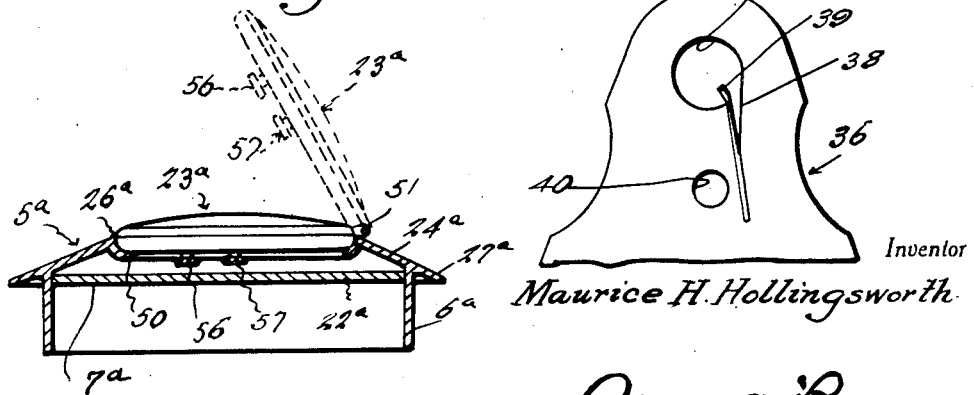
Inventor
Maurice H. Hollingsworth
By Clarence A. O'Brien and
Hyman Berman
Attorneys Patented Mar. 11, 1941

2,234,527

UNITED STATES PATENT OFFICE 2,234,527

CLOCK HORN BUTTON

Maurice H. Hollingsworth, Miami Beach, Fla.

Application March 12, 1936, Serial No. 68,531

3 Claims. (Cl. 58—46)

My invention relates generally to automobile horn buttons of the type mounted at the center of the steering wheel of the automobile, and particularly to a horn button in the form of a clock, and an important object of my invention is to provide a clock horn button which is wound and kept wound automatically by the rotation of the steering wheel as the automobile is being driven.

Another important object of my invention is to provide a clock horn button which can be bodily substituted for conventional horn buttons now used at the center of the steering wheels.

Another important object of my invention is to provide a clock horn button of the character indicated whose body portion or supporting member which carries the clock can be constructed in different diameters so as to have peripheral portions extending radially outwardly from the center of the steering wheel to positions approaching the periphery of the steering wheel, so as to position the body or supporting member for actuation by the hand of the driver while the hand is engaged with the rim of the steering wheel.

Other important objects of my invention will be apparent from a reading of the following description in connection with the drawings, wherein for purposes of illustration I have shown preferred embodiments of my invention.

In the drawings:

Figure 1 is a general top plan view of a steering wheel showing a clock horn button in accordance with the present invention installed therein.

Figure 2 is a top plan view of the hub of the steering wheel showing the horn button removed.

Figure 3 is a transverse vertical sectional view taken through Figure 1 approximately on the line 3—3.

Figure 4 is a bottom plan view of the clock horn button looking upwardly in Figure 3 approximately on the line 4—4.

Figure 5 is a bottom plan view of the clock horn button with the bottom plate 7 of the clock horn button body removed.

Figure 6 is a view similar to Figure 5 but with the operating inertia weight removed.

Figure 7 is an elevational view of the bayonet slots which are arranged in the conventional band on the sides of the steering wheel opening which is provided conventionally to attach releasably the conventional horn buttons and the clock horn button of the present invention.

Figure 8 is a plan view of a portion of the inertia weight showing the ratchet dog.

Figure 9 is an elevational view partly in section of the setting key.

Figure 10 is a top plan view of a modification wherein the clock of the clock horn button is hinged in place on the supporting member, the said clock having conventional clock mechanism, and being swingable to the dotted line position shown in Figure 11 for winding and setting purposes.

Figure 11 is a transverse vertical sectional view taken through the modified form of clock horn button shown in Figure 10.

Referring in detail to the drawings, the numeral 5 generally designates a clock horn button in accordance with the present invention and this comprises the flat cylindrical body or supporting member 6 whose lower end is closed by the removable plate 7 which is held removably in place by any suitable means and has on its bottom a metal plate 8 adapted to engage the upper end of the expanding spring 9 which is circumposed on and rises above the centering member 10 which is mounted on the floor of the well 11 which is formed in the hub 12 of the steering wheel which is generally designated 13, as clearly shown in Figure 3. Axially of the centering member 10 is the contact supporting member 14 which includes the block 15 incorporating the horn button contact 16.

Below the top of the well 11 is the bayonet slot retaining band 17 which contains the bayonet slots 18 which have the horizontal portion 19 opening into the vertical portion 20 which rises above and depends below the horizontal portion 19 to receive the lugs or bayonets 21 which are circumferentially spaced on the exterior of the peripheral wall of the cylindrical portion 6 of the supporting member.

The structure thus far described is typical of the conventional arrangements now in use for horn buttons at the center of a steering wheel, so that it is evident that the clock horn button of the present invention is mechanically perfectly adapted to replace the conventional horn buttons now in use simply by removing the conventional horn button and installing the clock horn button of the present invention.

Across the top of the flat cylinder 6 is a horizontal partition 22 above which the clock 23 is supported, the beveled annulus 24 rising radially inwardly to the flat top portion 25 which contains a beveled opening 26 engaging the top of the clock, and a radially outward portion 27 of the beveled annulus extends radially outwardly from the sides of the cylinder 6 and overhangs the steering wheel 13.

The overhanging annular portion 27 may be extended radially outwardly so as to overhang the steering wheel to a greater extent than shown in the present drawings, in order to present portions close to the rim of the steering wheel engageable by the hand of the driver without removing the hand from the rim of the steering wheel for operating the horn button.

In the embodiment of the invention shown in Figure 3, the clock 23 is held down in engagement with the partition 22 by the beveled opening 26, knobs 28 on the bottom of the clock resting on the top of the partition 22 so as to mount the clock 23 securely. Extending downwardly from the approximate center of the back of the clock 23 is the setting shaft 29 which extends into an opening 30 in the partition 22. An operating shaft 31 depends from an eccentric portion of the back of the clock 23 and through an opening 32 in the partition 22, and the shaft 31 has thereon a ratchet spur or wheel 33 which is located in the cylinder 6 between the partition 22 and the bottom 7. The bottom plate 7 has also an arcuate opening 34 registering with a slot 34' in the partition 22 enabling reaching the regulating lever 35 which is exposed by a slot 35' in the back of the clock.

Swingably mounted with respect to the ratchet wheel 33 and on the same axis is the inertia weight which is generally designated 36 and which is generally segmental in form and possessed of a comma-shaped opening 37 in its small end, in the tail portion 38 of which is mounted the flexible ratchet dog 39 which is engaged with the teeth of the ratchet wheel 33 the ratchet wheel being accommodated in the circular part of the opening 37. The arrangement of the ratchet dog and of the weight 36 relative to the ratchet wheel 33 is such that when the steering wheel is swung in one direction the weight 36 will remain behind and cause the dog 39 to slide over the teeth of the ratchet wheel, while when the steering wheel is swung in the opposite direction, the ratchet wheel 33 will be rotated and such rotation continued until the works (not shown) of the clock 23 are wound.

The inertia weight 36 has a smaller opening 40 radially outwardly of its opening 37 which can be registered with the opening 30 in the partition 22 to enable manipulation of the setting shaft 29 by means of the key 41 and which is provided for the purpose and which may be conveniently carried ready for use in a conforming opening 42 in the bottom of the well 11 in the hub of the steering wheel as shown in Figure 3. The weight 36 has a third opening 43 in its radially outward part which is registrable with the arcuate slot 44 in the plate 7; and the regulating lever 35 can be reached when the weight 36 is swung to clear the opening 34 as illustrated in Figure 5 of the drawings the edge of the weight having a cutaway portion affording this clearance.

When it is desired to reset or to regulate the clock 23, the clock horn button which is generally designated by the numeral 5 is simply removed from its place in the well in the center of the wheel in the same manner that other conventional horn buttons of this type are removed, and when removed the clock horn button has its bottom plate 7 removed so as to expose the various openings in the partition 22 for reaching the resetting shaft 29 or the regulating lever 35, as the case may be. Attention is called to the fact that the bore of the opening 37 in the weight 36 is smooth and that the weight swings free of the ratchet wheel 33.

The arcuate slot 44 in the plate 7 enables the insertion of a suitable instrument for engaging the opening 43 in the weight 36 when it is desired to wind or start the clock 23. The operation of winding is accomplished by oscillating the weight until the clock is sufficiently wound to run of its own accord. This provision is particularly useful for winding and starting the clock after the automobile has stood for a sufficiently long time to permit the clock to run down.

Referring to Figures 10 and 11 of the drawings showing a companion modification, it will be found that there are therein present the cylinder 6a of the first described embodiment topped by the partition 7a which is, in turn, topped by the upwardly and radially inwardly inclined annulus 24a which has the radially outwardly extending annular portion 27a which is extended radially outwardly so as to overhang the steering wheel to the desired degree, and may be radially extended to closely approach the rim of the steering wheel, if desired, to enable operation of the clock horn button which is generally designated 5a by the driver without removing his hand from the rim of the steering wheel.

The presently described embodiment does not have a bottom plate 7, but the partition 7a directly engages the spring 9 of the steering wheel arrangements including the horn button contact 16, when the button is depressed.

Instead of the overhanging beveled opening 26 shown in the priorly described embodiment, the present embodiment has the concave upwardly facing annulus 26a in the center of the member 24a, the said annulus being formed to provide the supporting flange 50 upon which the edge portion of the bottom of the clock 23a rests while in the normal position shown in full lines in Figure 11 and also in Figure 10. At the top of one side of the opening 26a is a hinge structure 51 in the form of a lug 52 having a hinge pin 53 traversing lugs 54 and 55 projecting from the corresponding edge of the clock 23a, whereby the clock 23a is swingably mounted in the top of the supporting medium which is generally designated 6a. Any suitable means (not shown) may be utilized to maintain the clock 23a in the position shown in full lines and resting on the flange 50, which is releasable in some suitable manner to permit the clock to be swung to the dotted line position shown in Figure 11 to provide access to the winding and setting members 56 and 57 which depend from the back of the clock. Like the cylinder 6 the supporting member 6a has lugs (not shown) projecting therefrom for engaging in the bayonet slots 18, 19, 20 of the band 17 in the well of the hub of the steering wheel for releasably mounting the clock horn button 5a in place on the steering wheel.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. The combination with a conventional horn button receiving well on an automobile steering wheel, said well including bayonet slots and a bottom contact, of a clock horn button comprising a supporting member in the form of a cylindrical shell, means removably securing said horn button in said well and permitting limited vertical movement of the horn button in the well, a partition at the upper end of said shell, an upwardly projecting annulus on the upper end of said shell above said partition, said annulus being formed with an opening, a clockworks disposed between said partition and said annulus, said opening exposing the top of said clockworks, said clockworks including a winding element depending through an opening formed in said partition, and inertia means in said shell below said partition and connected to said winding element to automatically effect winding of the clockworks as an incident to steering the wheel.

2. The combination with an automobile steering wheel having a conventional horn button accommodating well in its hub, said well being provided with horn button retaining means and at its bottom with a horn button operating contact; of a clock formed to normally telescope into said well and be depressible to engage and operate said horn button operating contact, said clock including elements effectively engageable with said horn button retaining means to normally retain said clock in said well for rotation with the steering wheel, said clock comprising a winding inertia weight wholly supported by said clock and spaced from said hub and said well and swingable on an axis substantially parallel to that of the steering wheel for winding the clock as the steering wheel is turned to either side in normal steering operations.

3. In combination with an automobile steering wheel having a conventional horn button accommodating well in its hub, said well being provided with horn button retaining means permitting relative movement of the horn button and a horn contact operated by depressing the horn button, of a clock horn button provided with means for operatively engaging said retaining means, said clock horn button comprising a shell shaped like a conventional horn button and bodily removable from the well but normally telescoped in said well, a clock on said shell, said clock having its face exposed at the top of the shell, a clockworks below the clock face and having a winding shaft, an inertia weight swingably mounted in said shell on an axis approximately parallel to that of the steering wheel and adapted to swing relative to the steering wheel and shell as the steering wheel and shell are turned, said inertia weight being operatively connected to said winding shaft and spaced from said hub and said well.

MAURICE H. HOLLINGSWORTH.